United States Patent
Ogasawara et al.

(10) Patent No.: US 8,291,100 B2
(45) Date of Patent: Oct. 16, 2012

(54) SERVICE MANAGING APPARATUS AND METHOD, AND SERVICE PROVIDING SYSTEM AND METHOD

(75) Inventors: Yasutaka Ogasawara, Kanagawa (JP); Yoshiyuki Kunito, Kanagawa (JP); Shinya Kimura, Kanagawa (JP); Isamu Yageta, Tokyo (JP); Satoshi Kawahata, Kanagawa (JP); Yosuto Masuda, Tokyo (JP)

(73) Assignee: Sony Corporation, Tokyo (JP)

( * ) Notice: Subject to any disclaimer, the term of this patent is extended or adjusted under 35 U.S.C. 154(b) by 1349 days.

(21) Appl. No.: 10/541,500

(22) PCT Filed: Nov. 16, 2004

(86) PCT No.: PCT/JP2004/016992
§ 371 (c)(1),
(2), (4) Date: Jul. 7, 2005

(87) PCT Pub. No.: WO2005/052803
PCT Pub. Date: Jun. 9, 2005

(65) Prior Publication Data
US 2006/0117097 A1 Jun. 1, 2006

(30) Foreign Application Priority Data
Nov. 25, 2003 (JP) .................................. 2003-394557

(51) Int. Cl.
*G06F 15/16* (2006.01)
*G06F 15/173* (2006.01)
*H04N 7/173* (2011.01)
(52) U.S. Cl. ........... 709/231; 709/223; 725/86; 725/105
(58) Field of Classification Search .................. 709/223, 709/231; 725/86, 105
See application file for complete search history.

(56) References Cited

U.S. PATENT DOCUMENTS
5,933,811 A * 8/1999 Angles et al. ............ 705/14
(Continued)

FOREIGN PATENT DOCUMENTS
JP 2002-342223 11/2002
(Continued)

OTHER PUBLICATIONS
International Search Report mailed Feb. 15, 2005.
(Continued)

*Primary Examiner* — Derrick Ferris
*Assistant Examiner* — Guang Li
(74) *Attorney, Agent, or Firm* — Rader Fishman & Grauer, PLLC

(57) ABSTRACT

A service providing system is provided which enables the users of an information transmission service in which information is sent and received in real time over a network to recognize their respective environment and conditions for provision of their own information. The service providing system (1) includes a service provider (2) including a communication server (11), a Web server (12) and a DB server (13) and a plurality of communication terminals (4) connected to the service provider (2) via the network, and it provides an information transmission service in which information is provided from one of communication devices to the other, or vice versa, in real time. The communication terminal (4) at the information provider first registers explanatory information, such as content, offering price, etc. of offered information to be provided into the DB server (13), and updates the information registered in the DB server (13) to a log-in status when the information provider has become able to provide the information in real time; and the Web server (12) updates the Web page at each time so that the explanatory information having thus been in the log-in status will be included in choices.

31 Claims, 11 Drawing Sheets

U.S. PATENT DOCUMENTS

| | | | |
|---|---|---|---|
| 5,999,525 A * | 12/1999 | Krishnaswamy et al. | 370/352 |
| 6,085,194 A * | 7/2000 | Ige et al. | 707/10 |
| 6,266,649 B1 * | 7/2001 | Linden et al. | 705/26 |
| 6,950,874 B2 * | 9/2005 | Chang et al. | 709/229 |
| 6,996,094 B2 * | 2/2006 | Cave et al. | 370/356 |
| 7,065,574 B1 * | 6/2006 | Saulpaugh et al. | 709/225 |
| 7,103,770 B2 * | 9/2006 | Conrath | 713/155 |
| 7,334,051 B2 * | 2/2008 | Koyata et al. | 709/246 |
| 2001/0014876 A1 * | 8/2001 | Miyashita | 705/37 |
| 2002/0002611 A1 * | 1/2002 | Vange | 709/223 |
| 2002/0042830 A1 * | 4/2002 | Bose et al. | 709/230 |
| 2002/0073205 A1 * | 6/2002 | Mostafa | 709/227 |
| 2003/0079020 A1 | 4/2003 | Gourraud et al. | |
| 2003/0140090 A1 * | 7/2003 | Rezvani et al. | 709/203 |
| 2003/0140095 A1 * | 7/2003 | Simpson et al. | 709/203 |
| 2003/0167305 A1 * | 9/2003 | Zhu et al. | 709/205 |
| 2004/0024652 A1 * | 2/2004 | Buhse et al. | 705/26 |
| 2004/0153504 A1 * | 8/2004 | Hutchinson et al. | 709/204 |
| 2006/0106874 A1 * | 5/2006 | Victor et al. | 707/104.1 |

FOREIGN PATENT DOCUMENTS

| | | |
|---|---|---|
| JP | 2003-150096 | 5/2003 |
| JP | 2003-187090 | 7/2003 |
| JP | 2003-281140 | 10/2003 |
| JP | 2003-319101 A | 11/2003 |
| JP | 2003-333659 A | 11/2003 |
| WO | WO-01/77947 A2 | 10/2001 |
| WO | WO-03/077144 A1 | 9/2003 |

OTHER PUBLICATIONS

PC Japan, vol. 7, No. 3, Softbank Publishing Inc., Mar. 1, 2002, pp. 180-185.

English Translation of Japanese Office Action issued Jul. 28, 2009 for corresponding Japanese Application No. 2003-394557.

Supplementary European Search Report issued Dec. 14, 2009 for corresponding European Application No. 04 81 9309.

* cited by examiner

SERVICE MANAGING APPARATUS AND METHOD, AND SERVICE PROVIDING SYSTEM AND METHOD

TECHNICAL FIELD

The present invention relates to a service managing apparatus connected to an IP (Internet protocol) telephone network to manage a service in which voice and information including a voice and a picture from one of two subscribers or users thereof are sent to the other by a media, and vice versa, in real time, a service managing method adopted in the service managing apparatus to manage the service, and a service providing system and method for providing the service.

This application claims the priority of the Japanese Patent Application No. 2003-394557 filed on Nov. 25, 2003, the entirety of which is incorporated by reference herein.

BACKGROUND ART

There is already available HTTP (Hyper Text Transfer Protocol) used to transfer documents in HTML (Hyper Text Markup Language) between the WWW (World Wide Web) and a Web browser.

There is disclosed in the Japanese Patent Application Laid Open No. 2003-150096, for example, an information providing system that generates ad information in HTML format as to merchandises (articles) set out in a predetermined space, such as display shelves in a store, by acquiring and consolidating information on the merchandise acquired from a radio tag preattached on each piece of the merchandise. Thus, the user of the information providing system, such as a merchandise purchaser, can observe the ad information without visiting the store.

In addition to the above-mentioned HTTP, the SIP (Session Initiation Protocol; an IETF Standard RFC2543) is also known. For communication by the VoIP (Voice over Internet Protocol) that encapsulates voice into an IP packet to enable voice communication over an IP network, for example, it is necessary to make, by a party at one end of the IP network, a sequence of information exchange operations including the acquisition of information on a party at the other end with which the one-end party is going to communicate, making of a call to the latter, reception of a response from the other-end party, etc. For this purpose, a call control protocol, such as SIP, is used. In a communication system using the IP telephone network, the SIP enables transfer of a picture, text data, a data file and streaming data in addition to a high-quality voice communication.

The general procedure of the communication using the SIP will be explained below. For real-time data transfer between communication devices, SIP-based call control is made in addition to the real-time data transfer. FIG. 1 shows a communication procedure in which a client CA (Bob) calls a client CB (Alice). Message data is transferred between the clients CA and CB under the call control of the SIP-based VoIP. In FIG. 1, it is assumed that a communication device P of Bob (bob@bbb.com) is a calling end while and a communication device Q of Alice (alice@aaa.com) is a called end and data (a message) is transferred between the communication devices P and Q of both the VoIP clients.

The SIP messages include a request message to be sent from UAC (UA Client) as a calling end to UAS (UA Server) as a called end and a response message to be returned from the UAS to UAC. The body of a request message includes session information based on the SDP (Session Description Protocol). Also, a predetermined response, such as an OK response, includes a SDP message to select a codec that is to be used for the communication.

A communication over the telephone between these clients CA (Bob) and CB (Alice) will be described by way of an example. First, Bob at the calling end picks up the handset from his communication device P and dials Alice's phone number. Thus, an INVITE for requesting joining the session is sent to the IP communication device Q of Alice at the called end (in step D11). The INVITE includes a SDP message that stated therein media information on a device that Bob's communication device P will use or the like. It should be noted that each of the messages which will be transferred thereafter includes some destination information. Referring to such destination information, etc., an IP telephone server or call controlling means at each end can send a message to a predetermined communication device. When the INVITE from Bob's IP communication device P arrives at Alice's communication device Q, the latter will send a response "100 Trying" to Bob's communication device P (in step D12). It should be noted that the above step corresponds to the process in the common telephone system from the silent-state up to the connection with the called end until the moment the calling end is connected to the called end.

Then, a response "180 Ringing" is sent from Alice's communication device Q to Bob's communication device P (in step D13). This step corresponds to the ringing of Alice's communication device Q. The responses "100 Trying" and "180 Ringing" indicate that the request has been received and is being processed at the other end. When Alice picks up the handset from her communication device Q, a response "200 OK" indicating that the request has been accepted is sent to Bob's communication device P (in step D14).

Then, Bob's communication device P at the calling end sends an ACK (acknowledgement) to Alice's communication device Q (in step D15). Thus, a communication port is opened to enable the communication between Bob and Alice. As above, the call control is followed by set-up of RTP/RTCP session and then by transfer of voice or data, such as voice, or voice and picture.

To terminate the communication, a message "BYE" is sent from the communication end at which the handset is first put back on the communication device to the other communication end (in step D16). Namely, the message "BYE" can be issued from either Bob's IP communication device P at the calling end or Alice's IP communication device Q at the called end, at whichever handset has been hung up, and the party having received the message "BYE" sends a response "200 OK" to the sender of the message "BYE" (in step D17).

Note here that while the IP telephone as a telephone over the Internet is rapidly prevailing, a fusion between a real-time communication (mainly over the IP telephone system), such as the IP telephone, and the aforementioned HTTP used mainly in the current Internet network has recently attracted attention in the industry.

However, the HTTP is a protocol for use in transferring text in HTML (Hyper Text Markup Language) between the WWW (World Wide Web) and a Web browser. Namely, it is most effective for communications effected in non-real time. Therefore, in a case where it is tried to use HTTP in fusion with the IP telephone system that is rather strictly required to show a highly real-time performance, it is difficult to provide any means for determining when information about a real-time situation should be coded with HTML, a means for confirming the reliability on information, etc. In actuality, it is difficult to attain a fusion between the IP telephone system and HTTP.

DISCLOSURE OF THE INVENTION

Accordingly, the present invention has an object to overcome the above-mentioned drawbacks of the related art by providing a novel service providing system and method and a service managing apparatus and method for the service providing system.

The present invention has another object to provide a service providing system and method for enabling users of an information transmission service in which information from one of the users is sent to the other, and vice versa, in real time over a network, to mutually recognize their respective environment and conditions for provision of their own information, and a service managing apparatus and method for management of the service providing system.

The above object can be attained by providing a service managing apparatus for managing an information transmission service in which information from one of the communication devices connected to each other over a network is sent to the other, and vide versa, in real time, the apparatus including, according to the present invention: a communication controlling means for controlling the communication with each of the communication devices; an information registering means for registering information on more than one piece of information to be provided by an information provider as information to be registered; and an information managing means for dynamically generating, based on the registered information, choices-window information from which an information user selects a desired one of the plurality of pieces of offered information, the information managing means updating, when the information registering means has been updated based on updating information reflecting the current status of the information provider, the choices-window information on the basis of the updated registered information.

In the above service managing apparatus according to the present invention, in case the information managing means for generating choices-window information for selecting a desired one of the pieces of offered information to be provided by the information provider in real time has been updated based on the updating information reflecting the current status of the information provider, the choices-window information is updated accordingly each time, so the choices-window information used for sending the offered information from the information provider to the information user in real time always reflects the current status of the information provider.

Also, each of the registered information and offered information includes information indicative of whether the information provider can provide the offered information in real time, the information managing means can have the choices-window information reflect the possibility/impossibility-of-real-time-provision information, and the information user can recognize, based on the choices-window information, whether the offered information can be used currently in real time.

Further, the information managing means may be designed to generate the choices-window information enabling the selection of offered information only when the information provider can provide the offered information in real time and indicating only pieces of offered information which can be provided at present in the choices-window information.

Furthermore, the updating information may include the possibility/impossibility-of-real-time-provision information indicative of whether the information provider can provide offered information in real time and media information indicative of the types of media usable for providing the offered information, and the information user can recognize, by referring to the choices-window information, which type of media can be used to provide the offered information.

Also, the communication controlling means can control the connection between a communication device that has selected a desired piece of offered information from the choices-window information and a communication device sending the selected piece of offered information, and it provides an alternative connection between communication devices using the service. So, it is not necessary to make any call control for the communication device at an information user who receives offered information to call the communication device at an information provider as a counterpart of the information user, which sends the offered information, for example.

Moreover, the information managing means can receive to-be-registered information and register it into the information registering means, and the communication controlling means can receive the updating information to update the registered information. Thus, it is possible to have the information managing means register the to-be-registered information, being static information, and the communication controlling means update the updating information being dynamic information, which varies dynamically corresponding to the environment of the information provider.

Also, the communication controlling means can receive the updating information from the communication device at the information provider who sends offered information in real time, whereby terminal-position information or the like as to that communication device can be sent as updating information at the same time.

Also, the above object can be attained by providing a service managing method of managing an information transmission service in which information from one of the communication devices connected to each other over a network is sent to the other, and vice versa, in real time, the method including, according to the present invention, an information managing step in which, referring to an information registering means in which information on more than one piece of offered information to be provided by an information provided is registered as registered information, there is dynamically generated choices-window information from which an information user of the offered information selects a desired one of the plurality of pieces of offered information, and an information updating step of updating, when the information registering means has been updated based on updating information reflecting the current status of the information provider, the choices-window information on the basis of the updated registered information.

Also, the above object can be attained by providing a service providing system which provides an information transmission service in which information is sent from one of the communication devices connected to each other over a network to the other, and vice versa, in real time, the system including, according to the present invention: a plurality of communication devices to send or receive offered information to be provided by an information provider or to be used by an information user, respectively, each as a user of the information transmission service; a service management device connected to each of the communication devices via a network to manage the information transmission service, each of the communication devices including a communication means for sending or receiving offered information to or from the other communication device as a counterpart; the service management device including a communication controlling means for controlling the communication with each of the communication devices; an information registering means for registering information on more than one piece of information to be provided by the information provider as information to be registered; and an information managing means for dynamically generating, based on the registered information, choices-window information from which the information user selects a desired one of the plurality of pieces of offered information, the information managing means updating, when the information registering means has been updated based on updating information reflecting the current status of the information provider, the choices-window information on the basis of the updated registered information.

In the above service providing system according to the present invention, the choices-window information from which an information user selects a desired one of the plurality of pieces of offered information provided by a plurality of information providers in real time can reflect the current status of each of the information providers, the information provider can have the choices-window information reflect his own current status, such as whether he can currently provide information to the information user, and the information user can select a desired one of the pieces of offered information after recognizing the current status of the information provider with reference to the choices-window information.

Also, in the above service providing system, the updating information includes possibility/impossibility-of-real-time-provision information indicative of whether the information provider can provide offered information in real time and user identification information for identification of the information user, the communication device to send offered information sends the updating information to the communication controlling means via the communication means, and the communication controlling means may be arranged to be able to update, when the information user has been authenticated based on the user identification information, the information registering means on the basis of the possibility/impossibility-of-real-time-provision information included in the updating information and not to update the registered information unless the communication device to send offered information has been authenticated based on the user identification information.

Also, the above object can be attained by providing a service providing method for a service providing system including a plurality of communication devices to send or receive offered information to be provided by an information provider or to be used by an information user, respectively, each as a user of the information transmission service in which information is sent from one of communication devices connected to each other over a network to the other, and vice versa, in real time, and a service management device connected to each of the communication devices via the network to manage the information transmission service, the method including, according to the present invention: an information registering step in which information on more than one piece of offered information to be provided by the information provider is registered as registered information into an information registering means of the service management device; an information managing step in which, referring to an information registering means of the information management device in the service management device, there is dynamically generated choices-window information from which an information user of the offered information selects a desired one of the plurality of pieces of offered information; a registered information updating step of updating the information registering means on the basis of updating information reflecting the current status of the information provider; and a choices-window information updating step in which an information management means updates, when the information registering means has been updated based on the updating information, the choices-window information on the basis of the updated registered information.

Also, the above object can be attained by providing a service managing apparatus for managing an information transmission service in which information from one of the communication devices connected to each other over a network is sent to the other, and vide versa, in real time, the apparatus including, according to the present invention: a communication controlling means for controlling the communication with each of the communication devices; an information registering means for registering information on more than one piece of information to be provided by an information provider as information to be registered; and an information managing means for dynamically generating, based on the registered information, choices-window information from which an information user selects a desired one of the plurality of pieces of offered information, since the information managing means updating, when the information registering means has been updated based on updating information reflecting the current status of the information provider, the choices-window information on the basis of the updated registered information, and thus the choices-window information from which offered information is selected is updated at each time, making it being possible to manage the information transmission service for real-time information transmission on the basis of the choices-window information always reflecting the current environment of the information provider who provides the offered information.

Also, the service managing apparatus according to the present invention can manage the real-time information transmission service.

Also, the above object can be attained by providing a service providing system which provides an information transmission service in which information is sent from one of the communication devices connected to each other over a network to the other, and vide versa, in real time, the system including, according to the present invention: a plurality of communication devices to send or receive offered information to be provided by an information provider or to be used by an information user, respectively, each as a user of the information transmission service; a service management device connected to each of the communication devices via a network to manage the information transmission service, each of the communication devices including a communication means for sending or receiving offered information to or from the other communication device as a counterpart; the service management device including a communication controlling means for controlling the communication with each of the communication devices; an information registering means for registering information on more than one piece of information to be provided by the information provider as information to be registered; and an information managing means for dynamically generating, based on the registered information, choices-window information from which the information user selects a desired one of the plurality of pieces of offered information, since the information managing means updating, when the information registering means has been updated based on updating information reflecting the current status of the information provider, the choices-window information on the basis of the updated registered information, making it possible for the information provider to register information he or she can provide and have the choices-window information reflect his own current status on the basis of the updating information while the information user can understand the current status of the information provider from the choices-window information, select and receive only information which can be provided currently from the information provider in real time, whereby the users of the information transmission service can mutually recognize their own current status in real time.

The service providing system according to the present invention can provide an information transmission service to make real-time communication of offered information.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

Figure 1:
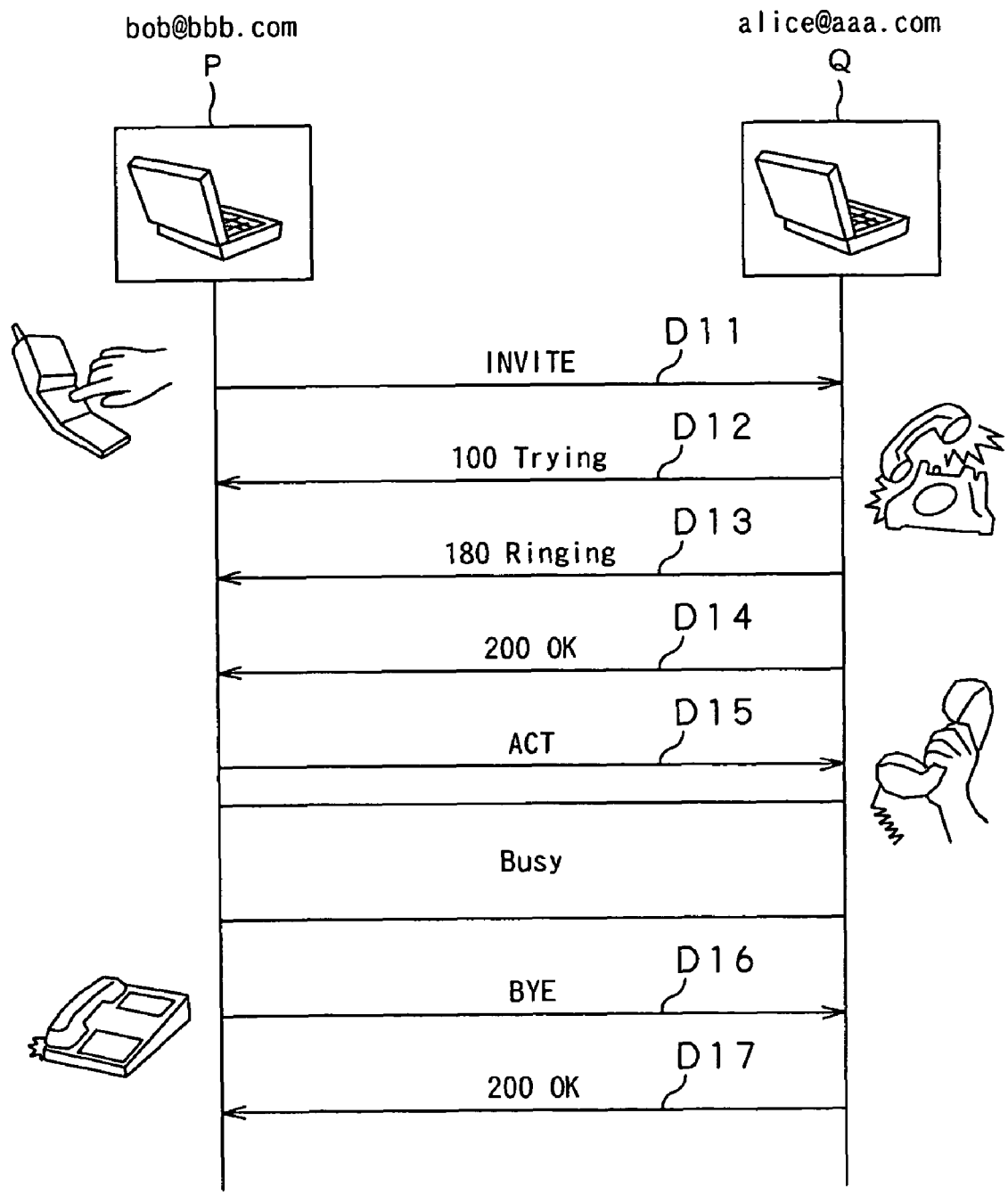
FIG. 1 shows the communication procedure in which the client CA makes a phone call to the client CB, showing the transfer of message data under the call control of the VoIP using SIP.

The present invention will be described in detail below concerning the embodiment thereof with reference to the accompanying drawings. This embodiment is an application of the present invention to a service providing system connected, via the Internet, to each of a plurality of communication terminals connected to each other via the Internet to provide a service that enables one of the communication terminals to provide information to another communication terminal in real time and an information transmission service that enables one of the communication terminals to selectively use a plurality of information provided from the other communication terminals.

For communication based on the VoIP, for example, it is necessary to make, at one end, a sequence of information exchange operations including acquisition of information on a counterpart at the other end, making a call to the latter, reception of a response from the other end, etc. and a call control protocol such as SIP (IETF Standard RFC3261) is used for this purpose. The SIP is a call control protocol for enabling a VoIP service and various multimedia sessions.

The service providing system according to this embodiment is to provide information such as "good restaurants", "recommended-to-visit spots", etc. (referred to as "offered information" hereunder) in real time by a communication or a picture. The service providing system adopts the SIP-based call control and enables an information transmission service for providing and using offered information transferred between the information provider and user by updating the Web page or the like in real time for selection of a desired piece of information one of offered information provided by the information provider to the information user. More specifically, there are preregistered a method of providing offered information provided by the information provider, an explanation of information on the fare of using the offered information, and static information which is an ad, which is updated based on a dynamic information variable depending upon the current environment and situation of the information provider whether the registered information can be provided in real time, and a Web server dynamically prepares, referring to the registered information thus updated, a Web page to select only information that can be provided in real time, thereby enabling this information transmission service.

Note here that the offered information provided in real time by the service providing system according to this embodiment is transferred from one of the communication terminals included in the service providing system to another communication terminal. The offered information may be information which itself is real-time, such as a picture being currently captured for transmission from the communication terminal at the information provider, and various data which themselves are not real-time and can be sent in real time to the communication terminal at the information user upon request, such as a video, a still picture, sound or the aforementioned information "good restaurants", "recommended-to-visit spots", etc. which are stored in the communication terminal at the information provider. The offered information which itself is real-time refers to information given by an information provider who is a tutor, English-conversation teacher, fortune-teller, legal counselor, or the like to an information user whose is a pupil, counsel-taker or the like, for example. Namely, the offered real-time information is given through real-time conversation over the common telephone, videophone or the like or given by a "good restaurants" information provider who actually visits the store and images the store inside. On the other hand, the information which itself is not real-time refers to a picture of the "good restaurant" captured and stored beforehand and provided to the information user upon request, for example.

Figure 2:
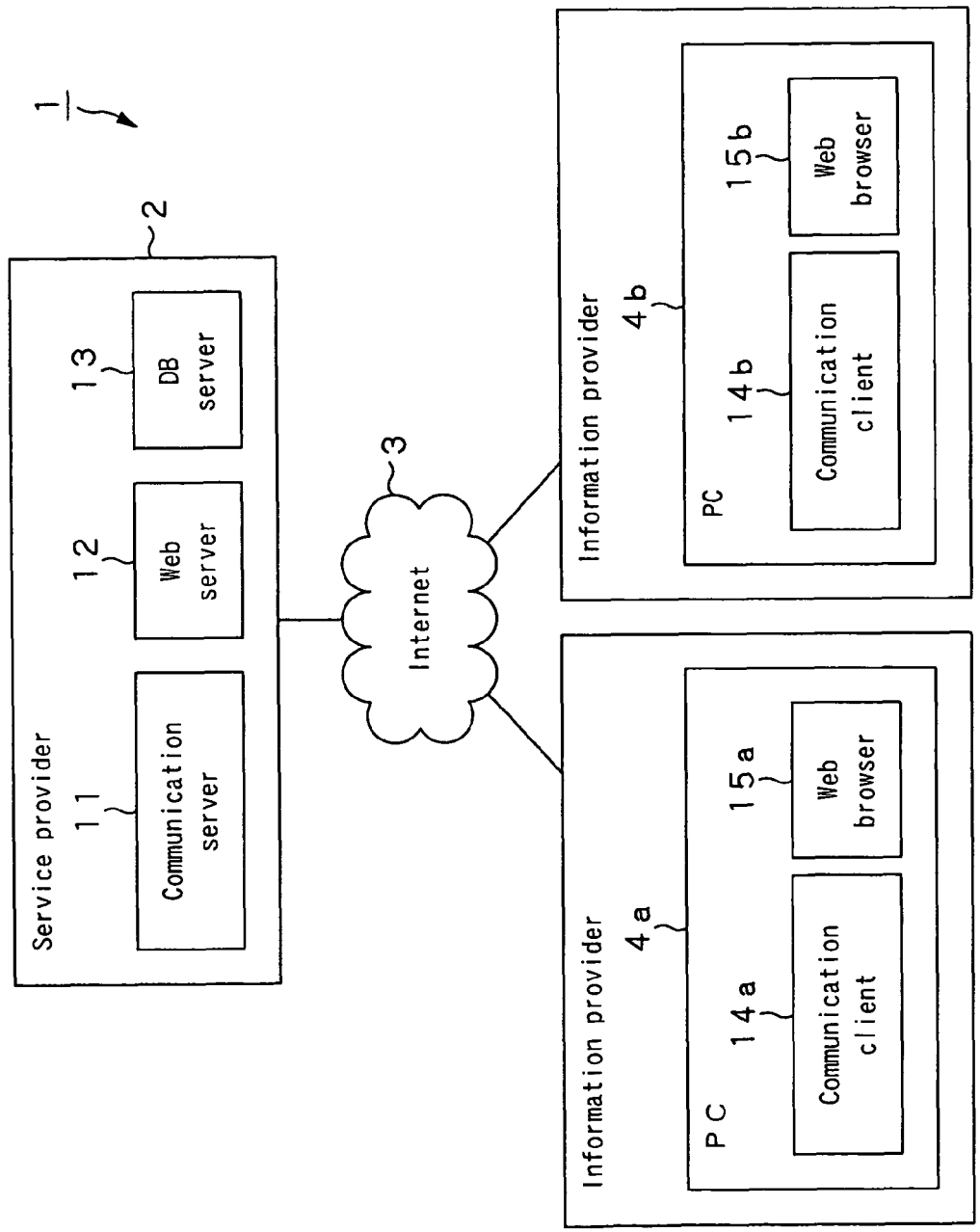
FIG. 2 is a block diagram of a service providing system according to the present invention.

FIG. 2 is a block diagram of the service providing system according to the present invention. As shown in FIG. 2, the service providing system according to this embodiment, generally indicated with a reference numeral 1, is a peer-to-peer real-time communication system including a service provider 2, a communication terminal at the information provider, connected to the service provider 2 via the Internet 3, that is, a communication terminal 4a to send offered information, and a communication terminal at the information user, connected to the service provider via the Internet, that is, a communication terminal 4b to receive the offered information.

The Internet 3 is a network environment of a worldwide collection of public telephone lines and a plurality of information communication networks. Currently, the Internet 3 enables broadband transmission owing to the prevailing broadband, high-speed communication lines. It uses optical fibers, asymmetric digital subscriber lines (ADSL) and radio networks to form a communication network of 500 kbps or more.

The service provider 2 includes a communication server (SIP server) 11 as a communication means for making communications with the information provider-side communication terminal 4a and the information user-side communication terminal 4b and controlling the connection between the communication terminals, a DB (database) server 13 as an information registering means for registering information including at least an explanation of offered information (will be referred to as "explanatory information" hereunder), such as an explanation of the content of offered information provided in real time by the information provider in this service, charges arising from the use or getting of the information (service charge), type of media used to distribute the information, and a Web server 12 as an information managing means for dynamically preparing a Web page as choices-window information on the basis of the information registered in the DB server 13. The information registered in the DB server 13 will be referred to as "registered information" hereunder. The choices-window information is to enable the information user to select a desired one from a plurality of pieces of offered information provided from a plurality of information providers. It may be a portal site formed from a plurality of Web pages, for example.

The information provider registers information in which the above-mentioned explanatory information has been included previously in the DB server 13. When the information provider is able to provide the offered information in real time, the information provider-side communication terminal 4a sends information reflecting the current status of the information provider, that is, updating information including log-in information as information on "possibility/impossibility of real-time information provision" indicating whether information can be provided in real time, to the communication server 11. The information on "possibility/impossibility of real-time information provision" will be referred to as "possibility/impossibility-of-real-time-provision information" hereunder. The communication server 11 updates the registered information in the DB server 13 on the basis of the updating information, and the Web server 12 dynamically prepares (updates) a Web page which enables the information user to select only the updated registered information, for example, offered information provided by the user, logged in the system because he or she can provide information in real time.

Each of the information provider-side communication terminal 4a and the information user-side communication terminal 4b is a terminal provided with a communication function, such as a personal computer (PC) or the like, and includes a communication client 14a (14b) and a Web browser 15a (15b). It should be noted that each of the communication terminals 4a and 4b may be a PC, a videophone, a telephone or the like which can make communications over a network. Namely, it is a device by which an information provider using this service providing system can provide information in real time and an information user using the service providing system can access information in real time for using the information.

Note also that in the following description, wherever the information provider and user are referred to just as an user of the service providing system without any distinction between them, the information provider-side communication terminal 4a and the information user-side communication terminal 4b will be referred to just as "communication terminal 4". Also, when the communication clients 14a and 14b and the Web browsers 15a and 15b may not be referred to without any distinction between them, respectively, they will be referred to as "communication client 14" and "Web browser 15", respectively. Further, offered information provided by the information provider also includes offered information on voice alone, for example, and the information provider-side communication terminal 4a only can send offered information and may not include the Web browser 15a. However, for registering explanatory information as to the offered information provided by the information provider into the DB server 13, the information provider-side communication terminal 14a has to register the explanatory information on itself from a communication device included in the Web browser.

Figure 3A:
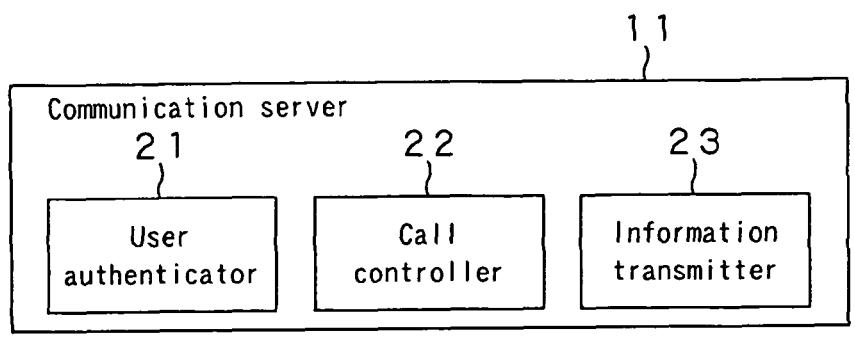
FIG. 3A is a functional block diagram of a communication server included in the service providing system.
Figure 3B:
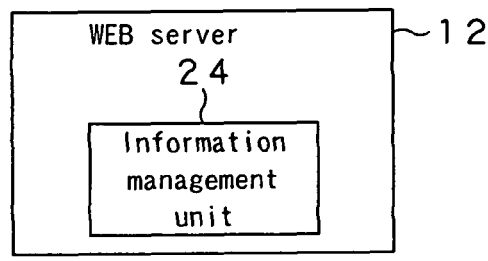
FIG. 3B is also a functional block diagram of a Web server included in the service providing system.
Figure 3C:
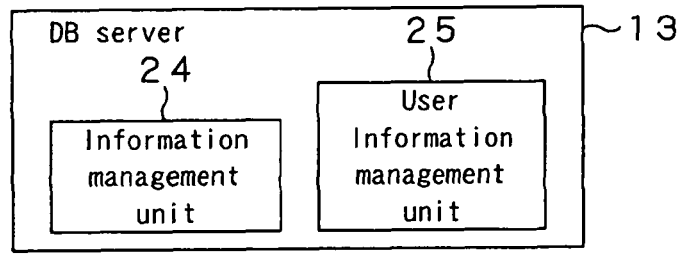
FIG. 3C is a functional block diagram of a DB (database) server included in the service providing system.

FIGS. 3A to 3D are functional block diagrams of the service provider and communication terminal included in the service providing system according to this embodiment. As shown in FIG. 3A, the communication server 11 of the service provider 2 includes an user authentication unit 21 to authenticate the user using each communication terminal 4, a call controller 22 to control the connection between two communication terminals 4, and an information transmitter 23 to transmit various kinds of information, such as updating information, to the DB server 13. Also, as shown in FIG. 3C, the DB server 13 includes an information management unit 24 to manage explanatory information on offered information of registered information, and a user information management unit 25 to manage user information intended for identification of a user having registered the registered information. As shown in FIG. 3B, the Web server 12 includes a service information management unit (portal) 26 to dynamically generate choices-window information (will be referred to as "Web page" hereunder) under the control of the information management unit 24 of the DB server 13.

Figure 3D:
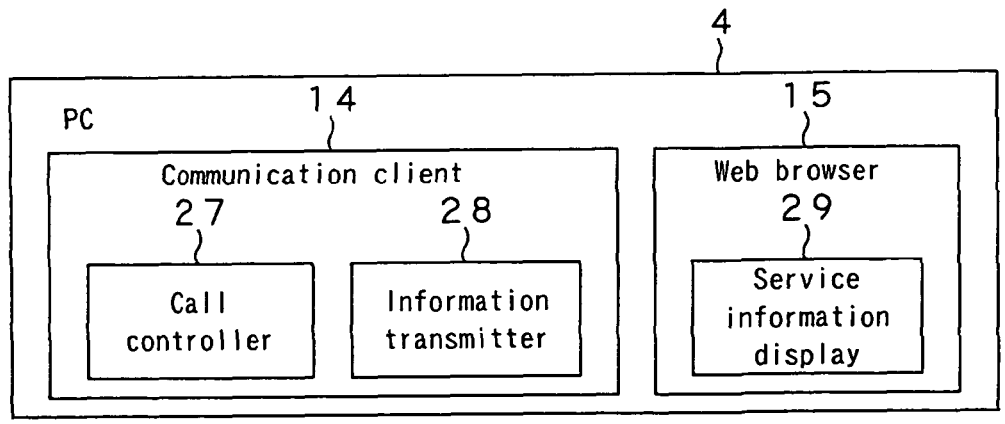
FIG. 3D is a functional diagram of a communication terminal included in the service providing system.

On the other hand, as shown in FIG. 3D, the communication client 14 operative on the communication terminals 4 at each of the information provider and information user includes a call controller 27 to set up, change and terminate a media session for transferring offered information to and from any other communication terminal 4 in real time and an information transmitter 28 to transmit updating information intended for reflecting the real-time status of the information provider to the information transmitter 23 of the communication server 11. The Web browser 15 includes a service information display unit 29 that displays various kinds of service information and in which the information provider registers explanatory information on information he is going to provide and the information user views a Web page in which he selects offered information he or she is going to get.

Figure 4:
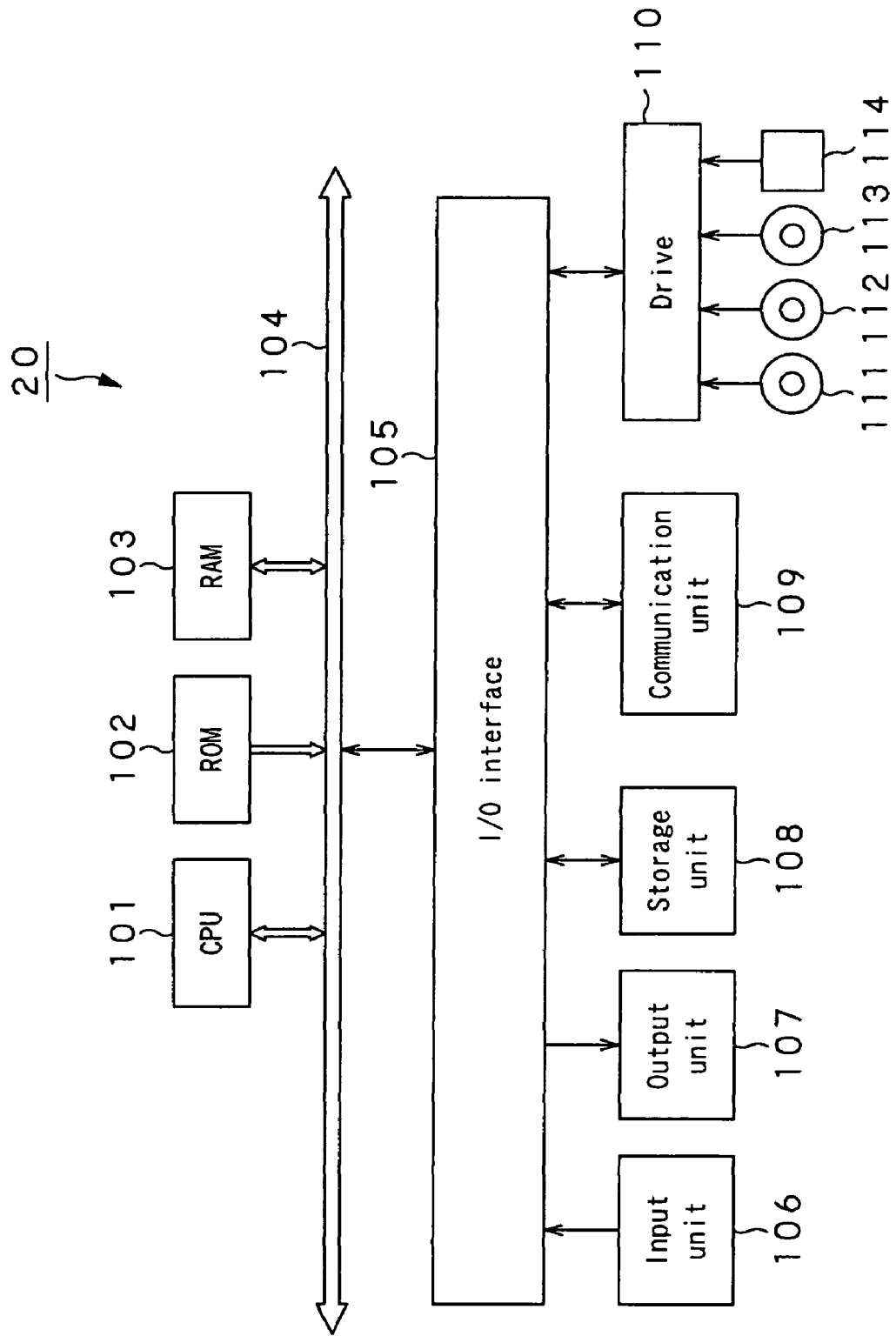
FIG. 4 is a block diagram of the hardware configuration of each of the communication server, Web server, DB server and communication terminal.

Each of the aforementioned communication server 11, Web server 12, DB server 13 and communication terminal 4 is constructed as shown in FIG. 4, for example. More specifically, each of them includes a CPU (central processing unit) 101 that performs various operations under various programs included in a software module stored in a ROM (read-only memory) 102 or various programs included in a software module loaded from a storage unit 108 into a RAM (random-access memory) 103, as shown in FIG. 4. Also, a timer (not shown) keeps time and supplies time information to the CPU 101. The RAM 103 further stores data, etc. required by the CPU 101 to perform various operations.

The CPU 101, the ROM 102 and the RAM 103 are connected to each other via a bus 104 to which an input/output interface 105 is also connected.

The input/output interface 105 has connected thereto an input unit 106 including a keyboard, a mouse, etc., an output unit 107 including a CRT or a LCD display, headphone, speaker, etc., a storage unit 108 including a hard disk etc., and a communication unit 109 including a modem, a terminal adapter, etc.

The communication unit 109 makes communications via an Internet (not shown). It sends data supplied from the CPU 101. Also, the communication unit 109 supplies data received from a communication counterpart to the CPU 101, the RAM 103 and a storage unit 108. The storage unit 108 communicates with the CPU 101 and stores/erases information. The communication unit 109 makes analog- or digital-signal communication with other units.

The input/output interface 105 also has connected thereto a drive 110 as necessary. Also, it has appropriately connected thereto a magnetic disk 111, an optical disk 112, a magneto-optical disk 113 or a semiconductor memory 114, and a computer program read from them is installed in the storage unit 108 as necessary.

Both the information provider and user use the information transmission service provided by the service providing system according to this embodiment of the present invention, and they can acquire the address of the communication server 11 operated by the service provider 2 and an authentication means under a contract made with the service provider 2 in advance. The authentication means includes, for example, an authentication ID and password. Using these authentication means, access can be made to a specific category in the Web server 12 and the DB server 13.

Using the Web server 12 via the Web browser 15 or the like of the communication terminal 4, the service user as a contractor with the service provider 2 can preregister information peculiar to the user, such as his or her name, a mail address or the like, into the DB server 13 via the HTTP or HTTPS (http over SSL (Secure Sockets Layer)). It should be noted here that the service user may register, as his own peculiar information, his address, phone number, and credit card, a settlement method of making a payment for the charge that arises when he provides or gets offered information, etc., in addition to his name and mail address.

Also, when the service user is going to provide information, he or she will register explanatory information on offered information including the name (content name) and price of the offered information, the name of the provider, etc., for example, into the information management unit 24 in the DB server 13 from the Web browser 15 via the Web server 12.

Upon registration of the explanatory information, the information management unit 24 in the DB server 13 will issue an information ID for unique identification of the explanatory information and send it to the communication terminal 4 in which the explanatory information has been registered. Also, the user information management unit 25 can store user information (peculiar information) included in the registered information into the information management unit 24 for each category. More specifically, the user information can be categorized according to his or her sex, age, district, and avocation, the content and kind of the offered information, which will be described in detail later, etc. Thus, the explanatory information can be correlated with each category classified based on the peculiar information.

Referring to the information management unit 24 in the DB server 13, the service information management unit 26 of the Web server 12 generates a Web page describing choices for selection of offered information provided by the information provider. At this time, different Web pages may be prepared depending upon what the offered information is, such as "good restaurants" or "recommended-to-visit spots", any legal aid service, any video being captured (real-time information), or stored information such as a picture, a sound, etc., depending upon the difference in content from one information kind to another. Also, Web pages which are to be provided by women in their twenties may be prepared for each of the categories as above on the basis of the aforementioned peculiar information.

Figure 5:
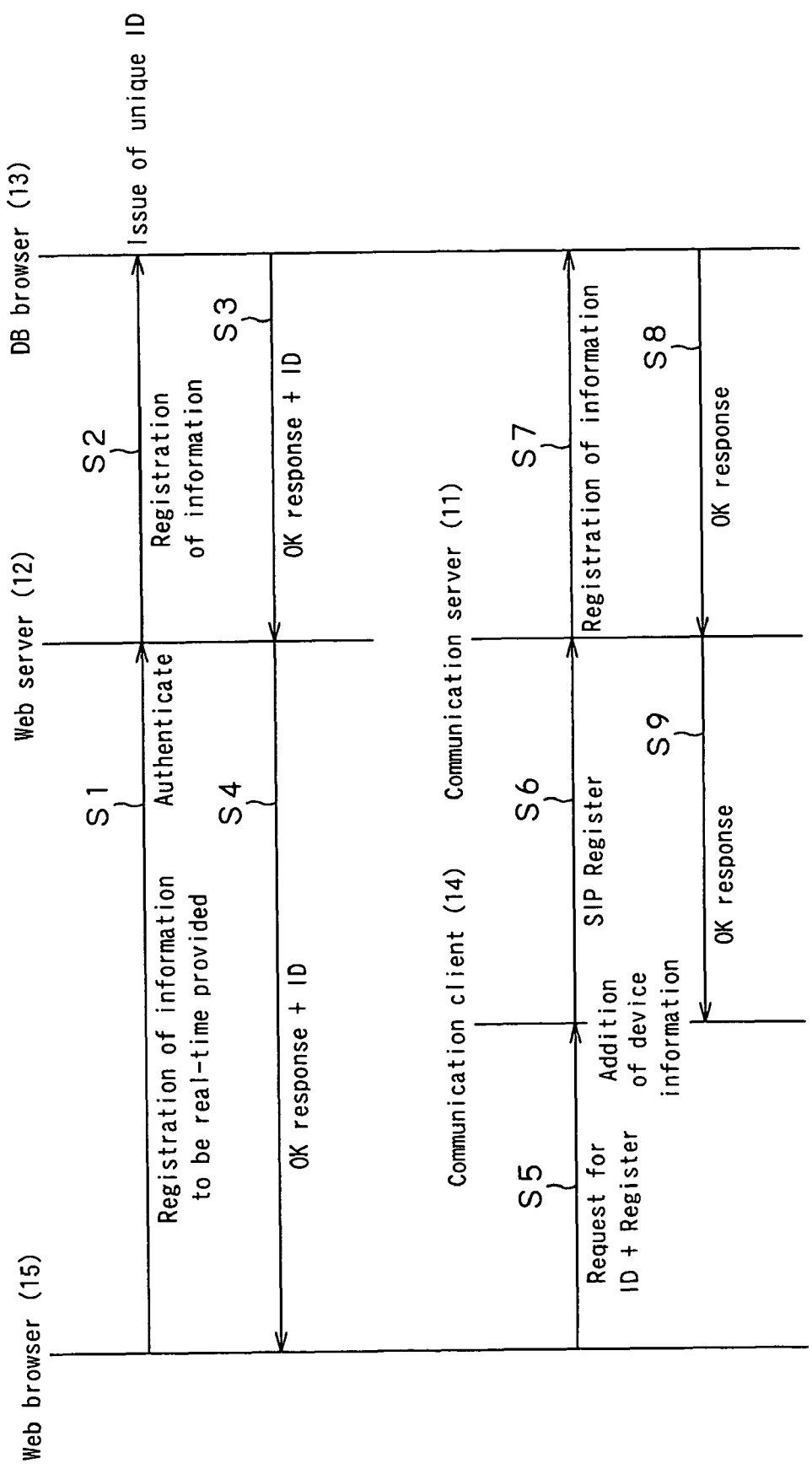
FIG. 5 shows a procedure of information transfer in the service providing system.

FIG. 5 shows information to be transferred in the service providing system according to this embodiment. As shown in FIG. 5, the user of the service provider 2 registers explanatory information on information that can provided into the information management unit 24 of the DB server 13 via the Web server 12.

First, the user accesses a predetermined information registration site of the Web server 12 from the Web browser 15 by an authentication means acquired when he made the contract with the service provider 2 (step S1). Then, the user registers information on offered information, that is, explanatory information for selection of the offered information, at the information registration site (information registration page) of the Web server 12.

The "explanatory information" includes various kinds of information including a content name indicative of the content of offered information, such as "Information on dainties in Shinagawa, Tokyo", a category indicative of a media used to distribute information, such as whether the information is real-time video (information, whether the information is a voice and a captured image or only a voice, etc., a price (charge) to be paid for provided information, status information indicative of whether information can currently be provided (information has been logged in), etc. Further, of such various kinds of information, the category indicative of an information distributing media, for example, or the like can be registered in plurality. For example, in case the information provider has only a telephone as the communication terminal, he will provide only a voice as the offered information; in case the information provider has a PC as the communication terminal but he is moving, for example, he is riding in an electric railcar, he will provide only text data as the offered information; and, in case the information provider is at home, he will provide a voice, text, a picture and a combination of them as the offered information. That is, the information providing conditions, such as the category of the information distributing media, will vary depending upon the current status (environment) of the information provider, such as the time and place he provides the offered information, the ability of the communication terminal that he has, etc. To accommodate such current status of the information provider, he may register a plurality of information providing conditions he can expect according to his situation; alternatively, he may send information indicative of an information distributing media by updating information for addition to the registered information or updating (changing) of the registered information without registration of such information providing conditions, as will be described in detail later. Also, for changing the price correspondingly to the kind of the information distributing media, for example, the information provider may register a plurality of prices for each category.

The Web server 12 sends the explanatory information to the DB server 13 (in step S2). The DB server 13 receives the explanatory information, issues an information ID (content ID) with which the explanatory information can be uniquely identified, and sends the content ID along with an OK response back to he Web server 12 (in step S3). The Web server 12 sends the content ID and the OK response sent from the DB server 13 to the Web browser 15 (in step S4).

Next, how the information provider having registered explanatory information on offered information through steps S1 to S4 as above has the Web page reflect the status of the information user when in a status (environment) where he can provide information will be described.

First, the communication client 14 will request the a content ID for explanatory information from Web browser 15 and register to be updated (in step S5). The call controller 27 of the communication client 14 sends position information (IP address) on a user as the information provider by register request in order to inform the user authentication unit 21 as a SIP registrar of the current-position information on the communication terminal (in step S6). With this register request, it is possible to set all incoming calls addressed to the user (SIP URL) for sending to a communication terminal 4 defined by the position information. Also, in the register request (message), time information can be registered in addition to the position information. For example, current-time information may be set such as "up to 4 p.m." or the like.

The communication client 14 sends the register message (request) to the user authentication unit 21 of the communication server 11 (in step S6). When the user is authenticated by the user authentication unit 21 through a predetermined authentication, the call controller 22 issues an OK response (200OK). Once the call controller 27 of the communication client 14 has received the OK response "200OK", it will control the information transmitter 28 to send, along with the content ID of the offered information, information indicative of the type of media used for distribution of the offered information (referred to as "media information" hereunder), the type of codec, information on devices used, etc. and other various kinds of information peculiar to the current status of the information provider, such as whether an image, for example, is a real-time one or an already captured one or the like, to the communication server 11. After receiving the content ID, device information appended to the content ID and other various kinds of information peculiar to the current status of the information provider (these kinds of information will be referred to as "updating information" hereunder), the information transmitter 23 of the communication server 11 sends the information to the DB server 13 for updating the registered information corresponding to the content ID (in step S7). The updating information thus received is to have the explanatory information on offered information that the information provider provides, such as whether the information provider can currently provide information, media used for distribution of the information, etc., reflect the current real-time situation of the information provider, whereby the registered information will indicate real-time information on the information provider. It should be noted that although it has been described above that the updating information, such as content ID and media information, is sent to the communication server 11 to update the registered information in the DB server 13, the registered information in the DB server 13 may be updated via the Web server 12, as in registration of the registered information.

Then, the DB server 13 sends an OK response indicating the reception of the updating information to the communication server 11 (in step S8). The communication server 11 will send the OK response to the communication client 14 (in step S9), and here the transmission of various kinds of information is over.

The DB server 13 merges the information reflecting the real-time status of the information provider, that is, information a device used for providing the service information or the like, included in the updating information formed including the content ID and information appended to the latter, received from the communication client 14 via the communication server 11 with the explanatory information cumulated in the DB server 13 in advance to update the explanatory information registered as one piece of information.

Thus, the information provider registers the explanatory information on the service information to be provided by him into the DB server 13 via the Web server 12 in advance through steps S1 to S4, as above. When the information provider has become able to provide information in real time, he updates the possibility/impossibility-of-real-time-provision information indicative of whether he can provide information in real time to the information that he can provide the information in real time, for example, by sending a register message (request) and updating information, to reregister the registered information as one which reflects his real-time status through steps S5 to S9, as above. Thus, the explanatory information (registered information) to be registered into the information management unit 24 always reflects the environment and information-providing conditions of the information provider.

Then, the service information management unit (portal) 26 existing in the Web site 12 will dynamically prepare a Web page on the basis of the registered information including the service information provided by the information provider. As has been mentioned previously, the Web page is categorized based on each explanatory information to indicate what the service information concerns, the age, the living district, etc. of each information provider, a good restaurant, a scene in Hakodate, a puppy or the like, whether valuable or not, a fortune-telling or legal advice, a tutor or an English school, or the like. Thus, the information user can easily select a desired one of the provided pieces of service information.

Also, even if the same information provider has offered a plurality of service information pieces, a content ID is appended to each of the pieces of explanatory information on the service information pieces, and the service information pieces are managed separately and displayed as separate links on the Web page. Thus, in case the information provider has offered a plurality of service information pieces, a request from the information user for a desired piece of service information by the content ID will permit the information provider to know which one of the plurality of service information pieces should be provided to the information user.

Further, when the registered information has been updated, notice of this fact may be sent to the service information management unit 26 from the communicator server 11 or DB server 13, and the service information management unit 26 will update the Web page accordingly or periodically (at every predetermined time).

Figure 6:
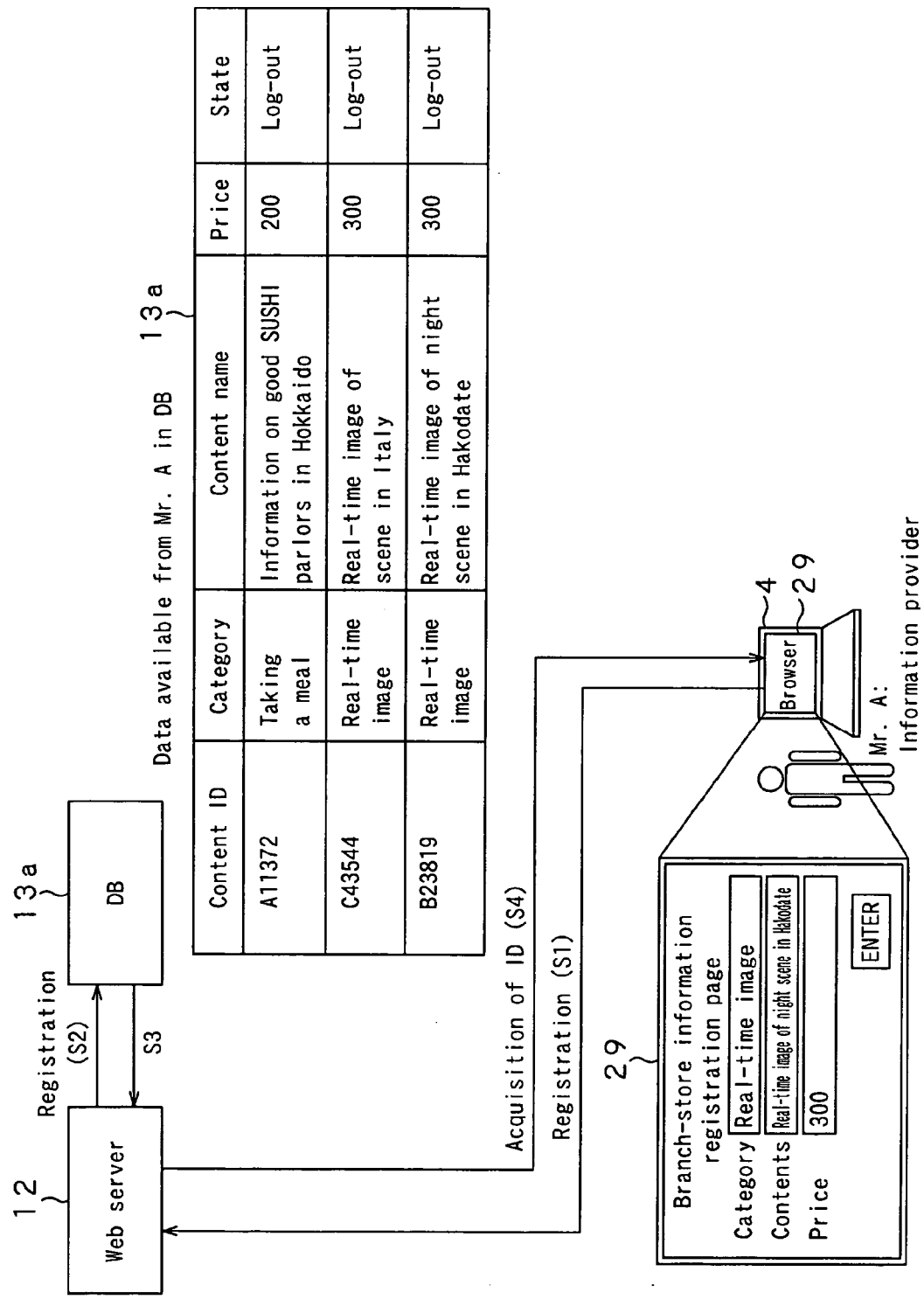
FIG. 6 schematically illustrates how information provided by an information provider A among users of the service providing system in real time is registered.

The above-mentioned series of operations will be described further in detail with reference to FIGS. 6 to 10. FIG. 6 schematically illustrates how service information provided by an information provider A among the service users is registered, that is, the procedure including steps S1 to S4 that has been described in the foregoing. As above, the information provider A has registered his own name or the like in the service provider 2 to acquire an authentication ID in advance. Then, he uses the authentication ID to access a predetermined service providing site, for example, the "Branch-store information registration page" as in FIG. 6, offered by the service provider 2 in the Web server 12 of the service provider 2 as shown in FIG. 6. Then, the information provider A enters information in predetermined information fields such as the category indicative of the type of a medium by which the information is to be distributed, the content name explaining what the content he is going to provide is, the price of the content, etc. In FIG. 6, the category is "Real-time image" for real-time distribution of an image being captured to the information use, the content name is "Real-time image of night scene in Hakodate", and the information price (content price) is "300".

The data registered by the information provider A in the branch-store information registration page in the Web server 12, that is, the explanatory information on the information to be provided in real time, is registered in the DB server 13 where a unique content ID will be appended to the explanatory information (in step S2), and the explanatory information in the DB server 13 is returned from the DB server 13 to the communication terminal 4 of the information provider A via the Web server 12 (in steps S3 and S4). Thus, the information provider A completes the registration of the information he is going to provide in real time. The information 13a in the DB server 13 is tabulated according to each of pieces of service information offered by the same information provider on the basis of user information corresponding to the aforementioned authentication ID, etc. of the information provider A.

Figure 7:
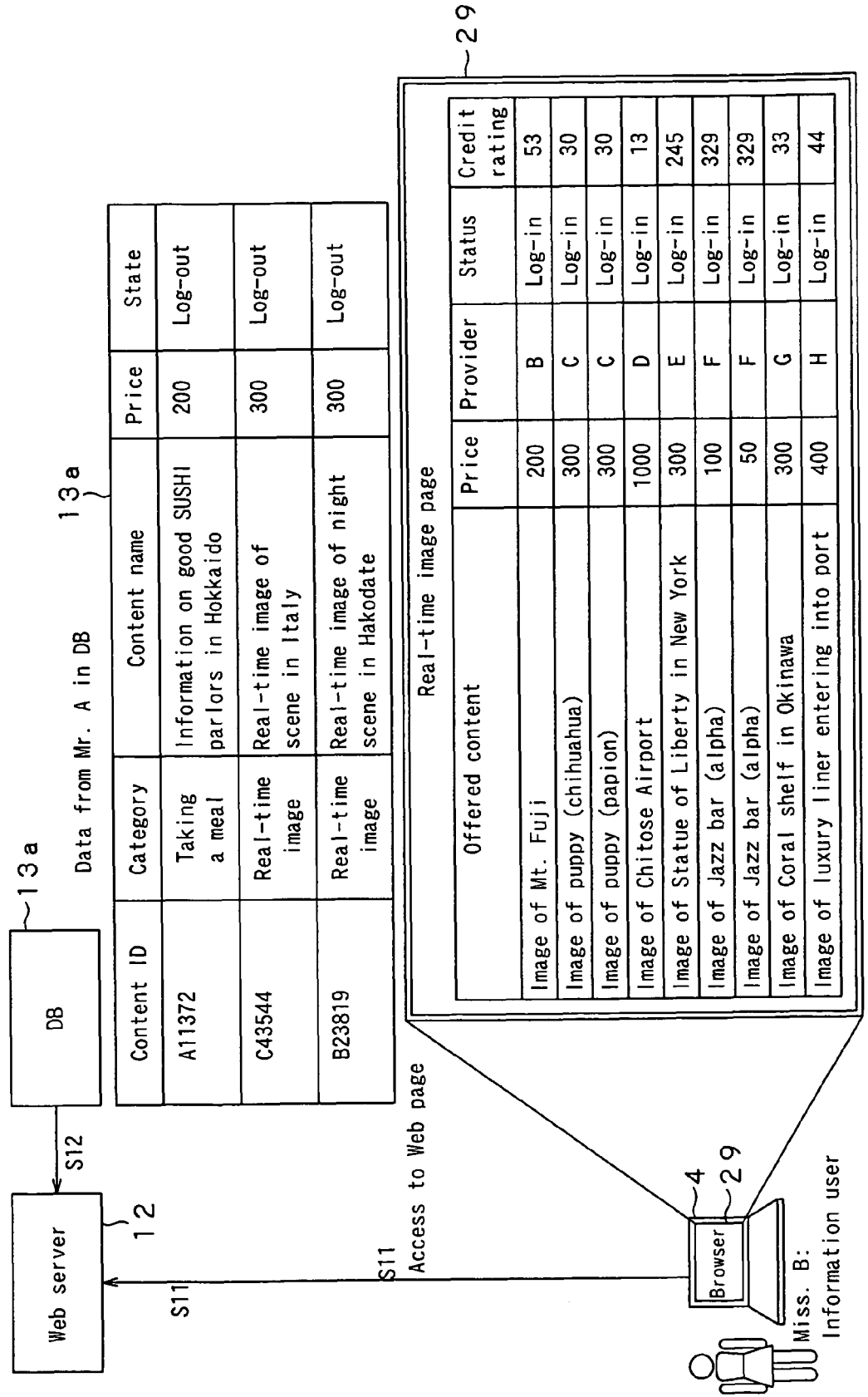
FIG. 7 schematically illustrates how an information user B among the users of the service providing system accesses a Web site to get information.

FIG. 7 schematically illustrates how an information user B among the service users accesses a Web page to get the service information. Like the aforementioned information provider A who provides service information, the information user B using or getting the service information also registers user data into the service provider 2 and acquires an authentication ID beforehand. By this system in which each of the information provider A and the user B has to be authenticated by getting the authentication ID before accessing the service site as described concerning this embodiment, it is possible to prevent them from passing himself on as any other person and from offering any false information.

Then, the information user B is allowed by his own authentication ID to access a Web page at a predetermined site, namely, the "Real-time image page" as shown in FIG. 7 (in step S11). The Web page is dynamically prepared with the operations shown in FIG. 5 on the basis of the registered information, including explanatory information, registered in the DB server 13 by the information providers, including the information provider A, among a plurality of service users registered in the service provider 2 for using this service. That is to say, the information 13a in the DB server 13, including explanatory information on service information such as contents, includes content ID and explanatory information for each information provided in association with each other, and a Web page is prepared based on the information 13a in the DB server 13, such as category, price, etc. (in step S12). Also, in the information 13a in the DB server 13, the "Status" column states a status in which the information provider having a content ID issued to him has logged in service information, namely, possibility/impossibility-of-real-time-provision information indicative of whether the information provider can currently provide service information. Thus, the Web page can reflect the Status column. More specifically, only the service information for which the Status column states "log-in" can be displayed in the Web page as a service information that the information provider can currently provide. For example, all the Status fields in the information 13a in the DB server 13 for the information provider A state "log-out", which means that the information provider A cannot currently provide any information. Therefore, since a service of providing service information in real time cannot be done, no service information is displayed in the choices-window information "Real-time image page" for selection of service information.

Also, the Web page "Real-time image page" includes a service content name, a price, and a name (nickname), and the status and credit rating of information provider. The "Credit rating" will be explained here. When the information user B used one piece of service information provided in the past and appreciated it as good, the credit rating is "1". Each time the same user (with the same authentication ID) has such an appreciation, the credit rating of the information provider will increase accordingly. Whenever the information users have been provided with a predetermined piece of service information, such as "Image of Mt. Fuji", for example, and appreciated it as very good, the credit rating will be "10", for example. When the information users have appreciated the "Image of Mt. Fuji" as reasonable, the credit rating will be "5". When the information users have appreciated this service information as useless, the credit rating will be "0". Such credit ratings are added together for each content ID. Also, the credit rating of the information provider and that of the content of service information may be displayed in total. The information can take the credit rating as an index in selecting service information provided by an information provider.

Figure 8:
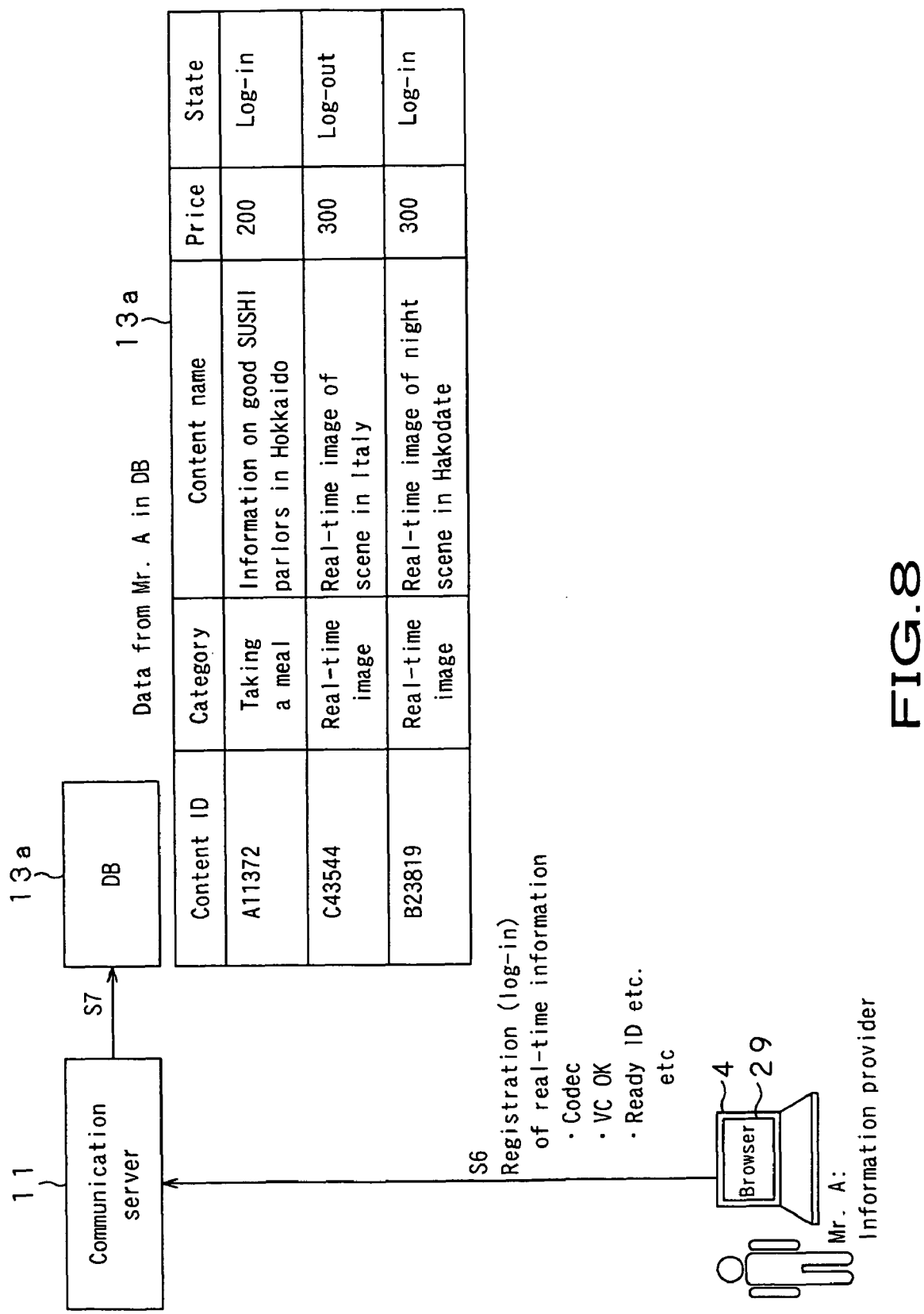
FIG. 8 schematically illustrates how explanatory information registered by the information provider A shown in FIG. 6 is made to reflect his own real-time status.

Referring now to FIG. 8,
how explanatory information registered by the information provider A is made to reflect his own real-time status will be explained. For the information provider A to update the information that has been registered as shown in FIG. 5, he has to make the registered information reflect the current status of the information provider. Since the Status column in the information 13a in the DB server 13 states "Log-out" (no register), the information provider has to shift his own status from the impossibility of real-time information provision to a status in which he can provide information in real time, as will be described herebelow. First, the communication client 14 is authenticated by the service provider 2 on the basis of the authentication ID, then it requests the Web browser 15 for a content ID and registered information for logging in service information, that is, for providing service information via the information transmission service, and sends a register request to the communication server 11. Next, the communication client 14 passes service information to the communicator server 11 with the content ID, information on a medium by which information which can currently be provided in real time is distributed, namely, the type of codec, and VCOK information indicative of the log-in status appended to the service information (in step S6). The communication server 11 passes the information passed from the communication client 14 to the DB server 13 (in step S7). The DB server 13 rewrites the information 13a in the DB server 13 with the passed information. FIG. 8 shows an example in which the Status in the explanatory information on information whose content IDs are A11372 and B23819 in the information 13a in the DB server 13 has been changed (updated) to a "log-in" status. It should be noted that even in a case where the communication terminal Q for providing information, such as a PC, for example, is different from the communication terminal T, such as a telephone or the like, if it is a communication terminal (SIP client) compatible with SIP, registered information on information provided from the communication terminal T can be changed to a "log-in" status.

Figure 9:
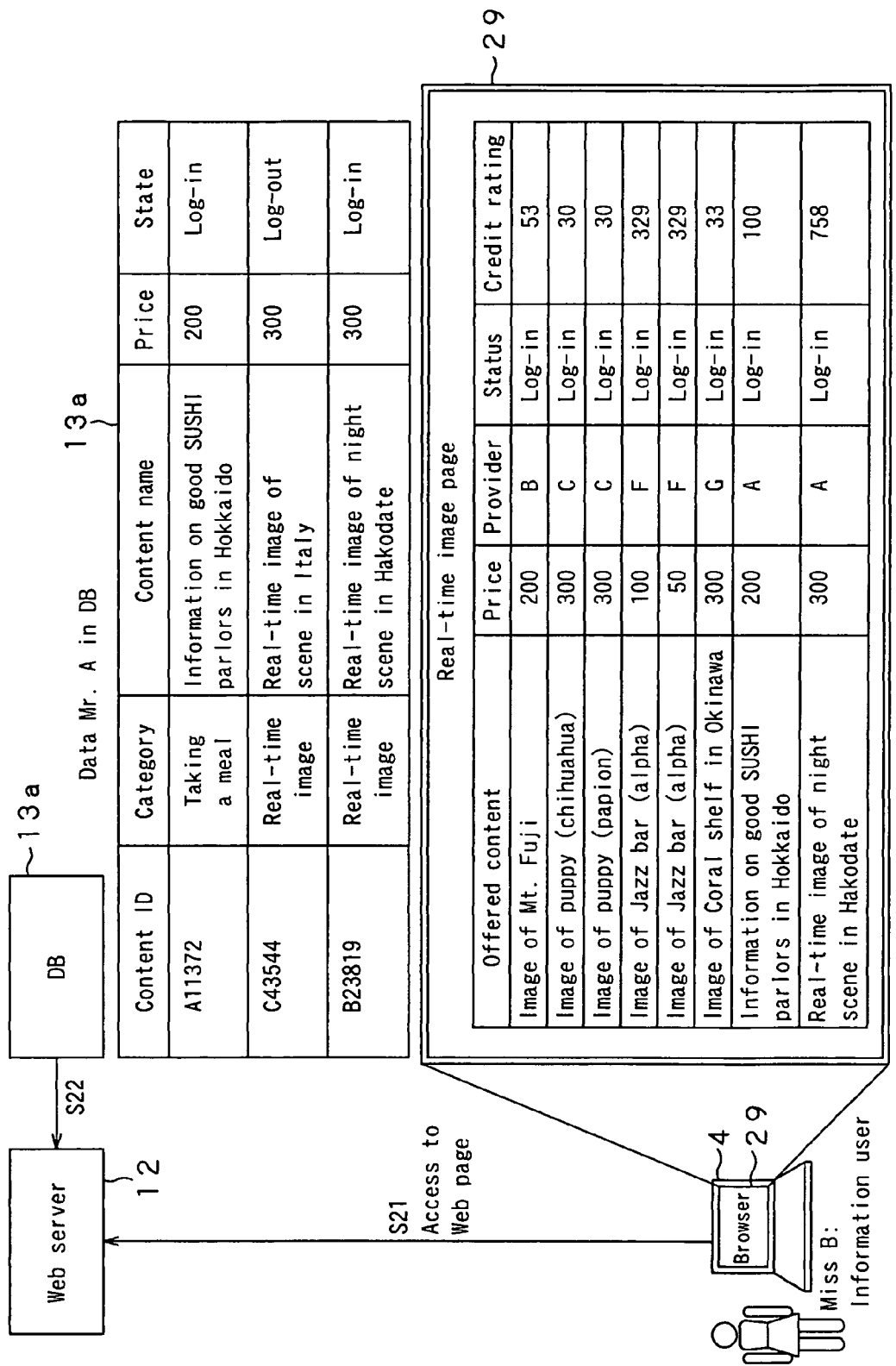
FIG. 9 schematically illustrates how information 13a in the DB server 13, updated by the method shown in FIG. 8, is reflected by the Web page.

When the information user B accesses the "Real-time image page" in the same manner as in FIG. 7 in this condition, the "Real-time image page" will be changed as on the screen of the service information display unit 29 on which there is displayed to be usable the information whose content IDs are A11372 and B23819 in the information 13a in the DB server 13 (in step S21), as shown in FIG. 9. That is, since a portal site (Web page) is dynamically prepared on the basis of the information 13a in the DB server 13, the service information management unit 26 in the Web server 12 reprepares a Web page correspondingly to information that the information provider A has logged in for real-time provision (in step S22).

Figure 10:
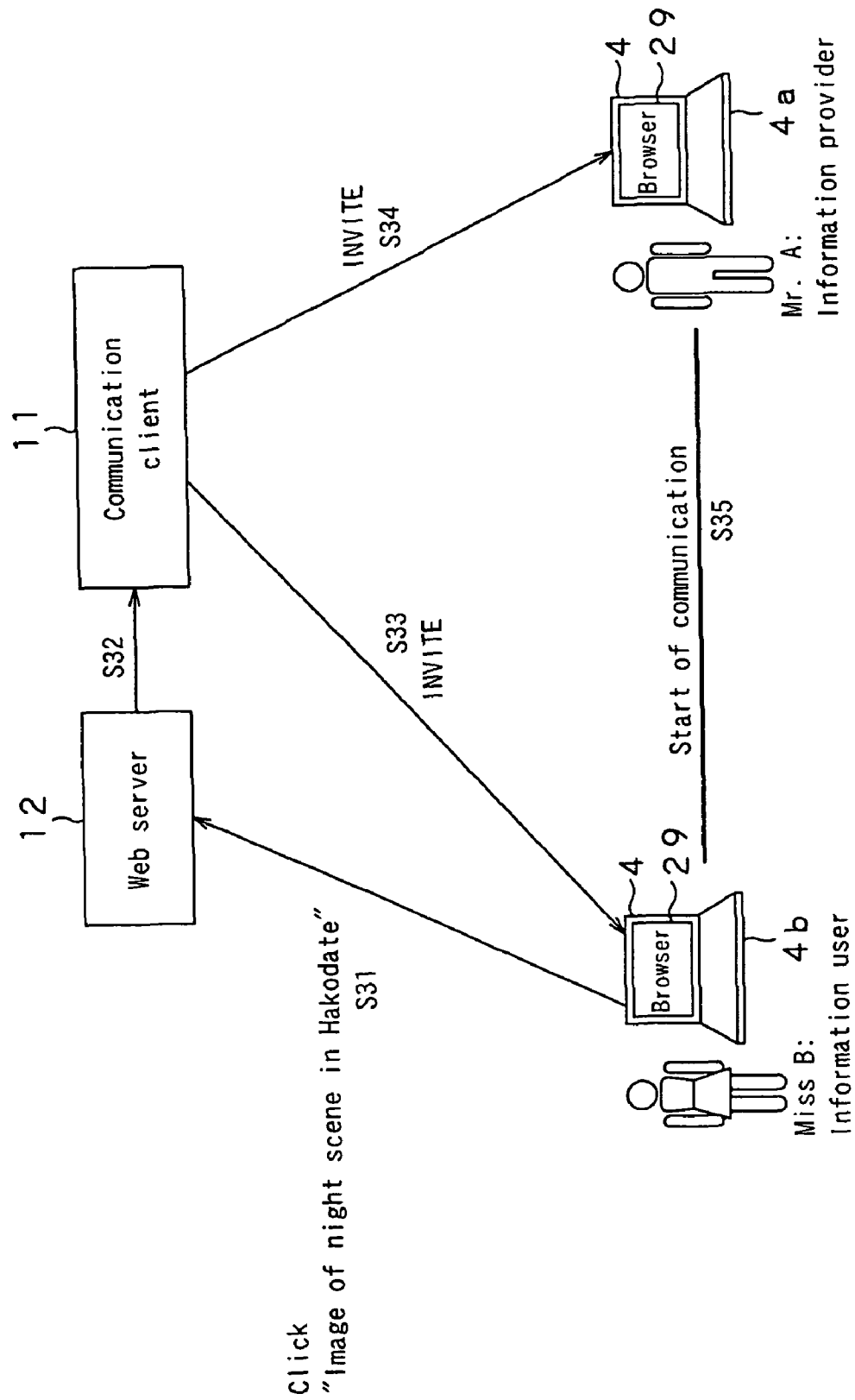
FIG. 10 schematically illustrates the service providing method performed in the service providing system.

FIG. 10 schematically illustrates the service providing method performed in the service providing system. As shown in FIG. 10, the information user B having accessed the Web page reflecting the current status of the information provider A, as shown in FIGS. 6 to 9, will view the Web page "Real-time image page" from the Web browser 15 to select and click one desired piece of information "Real-time of night scene in Hakodate" in the information on the Web page (in step S31). Thus, the Web server 12 informs the communication server 11 that the information user B has selected the service information "Real-time image of night scene in Hakodate" provided by the information provider A (in step S32). Thus, the communication server 11 sends a request for joining session INVITE to both the communication terminals A and B with which communications are going to be made in a manner that will be described in detail later (in steps S33 and S34), sets up a session between the information provider A and user B and starts the communication such as talking.

Note that an interface server for converting HTTP into SIP, that is, a converter providing a communication between the Web and SIP, (not shown) is provided between the Web server 12 and the communication server 11 or inside the communication server 11. The interface server enables data transfer between the Web server 12 and communication server 11.

Note here that the system may be so arranged that the Web server 12 sends the authentication ID of the information provider A and the content ID of the explanatory information "Real-time image of night scene in Hakodate" provided by the information user B to the DB server 13, acquire necessary position information, etc. for the SIP-based call control between the information provider A and user B, and send the position information to the communication server 11.

Figure 11:
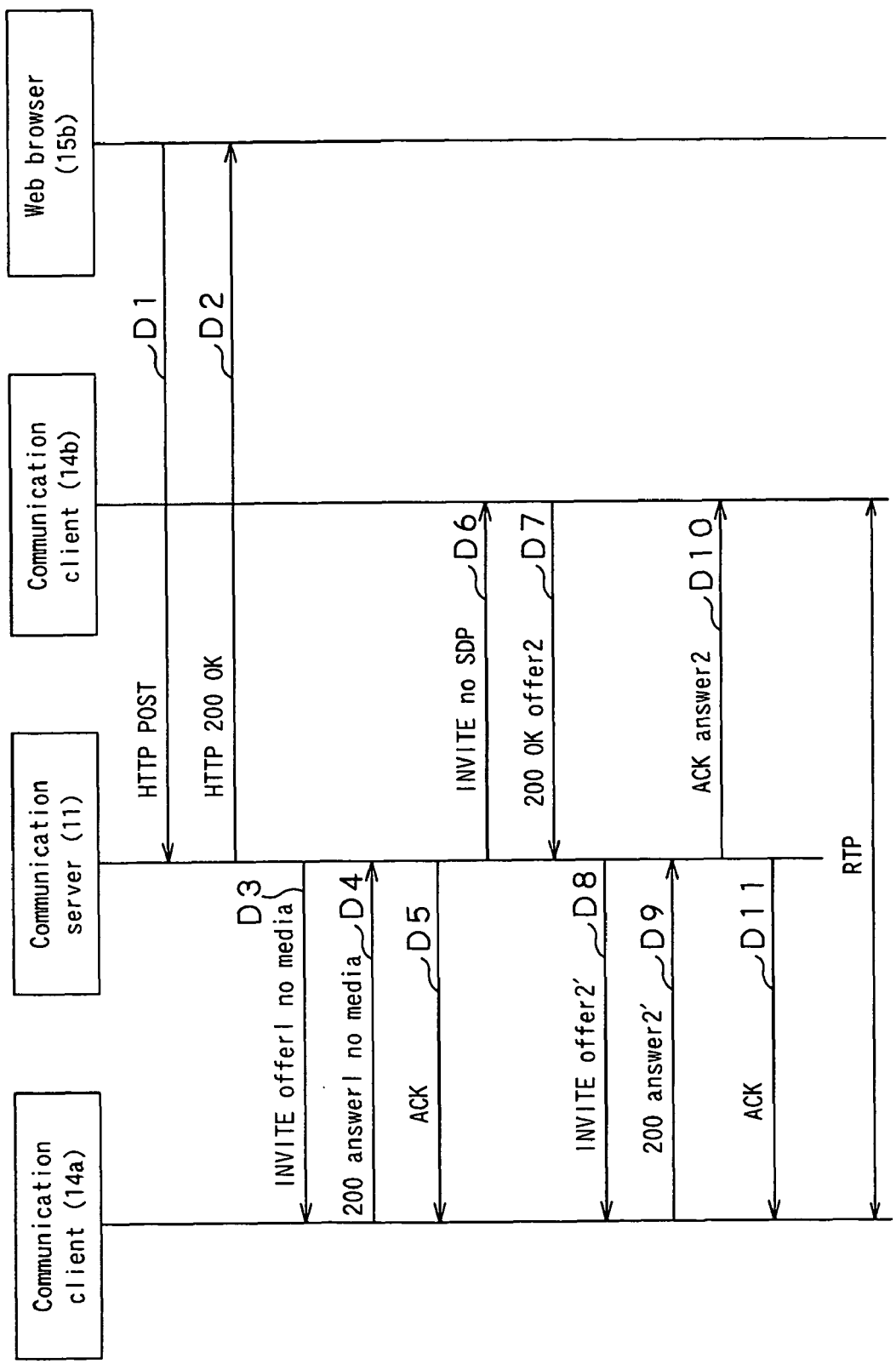
FIG. 11 shows a procedure for call control of the communication server.

Next, how the communication server 11 uses the SIP to set up a session between the communication terminal 4b of the information user and communication terminal 4b of the information provider will be explained. FIG. 11 shows a procedure for call control of the communication server. How the communication server controls the call to start the communication with the information user A when the information user B clicks on the Web browser is disclosed in the Internet draft (draftietf-sipping-3 pcc-04, click to dial) as to SIP 3 pcc (third party call control) of IETF (Internet Engineering Task Force) etc. The service in which just clicking a button in a home page leads to an automatic call to a set telephone number and to a connection with a communication terminal such as PC is called a "Web calling service" or the like.

The SIP message includes a request message and a response message, and the message body of the request message and a predetermined response such as an OK response may have stated therein session information based on SDP (Session Description Protocol) and intended to select a codec which is to be used for communication, or the like. By transferring these messages, a session between the communication terminals can be set up. First, when the information user clicks a desired information field in the Web page in the Web server via the service information display unit 29 of the Web browser 15b, HTTP POST informing the selection of a predetermined information is sent to the call controller 22 of the communication server 11 via the call controller 27 of the communication client 14b (D1). In response to the information, the call controller 22 of the communication server 11 will return a HTTP 200OK response to the communication client 14b of the information user B (D2).

Next, the call controller 22 of the communication server 11 acquires information indicative of the position of the communication terminal 4a at the information provider A that has provided specified information or the like from the user information management unit 25 of the DB seer 13 and sends INVITE to the communication client 14a of the communication terminal 4a at the information provider A (D3). The INVITE (INVITE offer1 no media) 1 does not state therein any media information for specifying a medium by which information is transferred. In response to the INVITE, the communication client 14a at the information provider will return a 200 response (answer1 no media) (D4). The 200 response includes answer1 without media information. The call controller 22 of the communication server 11 returns ACK (D5).

Then, the call controller 22 of the communication server 11 sends INVITE (INVITE no SDP) to the communication client 14b of the communication terminal 4b at the information provider (D6), and receives a 200OK response (200OK offer2) (D7). The INVITE (D6) includes no SDP message for specifying a media type, but the 200OK response returned from the communication client 14b having received INVITE (D6) includes offer2. The communication server 11 adjusts answer1 received from the communication client 14a at the information provider A and offer2 received from the communication client 14b at the information user B to prepare offer2' and sends INVITE (INVITE offer2') back to the communication client 14a at the information provider A (D8). The communication server 11 receives 200OK (answer2') from the communication client 14a having received the INVITE (INVITE offer2') (D9) and sends ACK (answer2) to the communication client 14b (D10) while sending ACK to the communication client 14a (D11). Thus, a RTP session is set up between the communication terminal 4a of the information provider A and communication terminal 4b of the information user B.

By setting up the session between the information provider A and the information user B, more specifically, by sending a SIP message to the information provider A in the place of the information user B and sending the SIP message to the information user B in the place of the information provider A, as above, the communication server (SIP server) 11, as a third party, makes a connection between the communication terminal 4a of the information provider A and the communication terminal 4b of the information user B, both sending and receiving real-time data between them. The communication server 11 adjusts the contents of the messages from both the information provider A and the information user B and controls the connection between them. Thus, the information provider A and information user B, as the users of the service, can set up a media session without having to know any connection address of their counterparts by registering personal data, such as terminal position-information on themselves in the service provider 2.

In the information transmission service according to the present invention, in which one of communication terminals capable of transferring real-time data between them, such as a telephone with only voice, a videophone or the like, provides service information to the other while the latter uses the provided service information, the service provider 2 dynamically prepares a Web page reflecting the current status of the information provider, including whether the information provider can currently provide service information, such as whether the service information can currently be provided, what the media used for providing the service information is, etc., and can thus have the information user recognize the client environment, service conditions, etc. of the information provider. Since a Web page intended for the information user to select a desired one of a plurality of pieces of information provided by the information provider is dynamically prepared at a portal site of the Web server 12 correspondingly to the current status of the information provider, the information user accessing this Web page for selection of service information can check the current status of the information provider and information providing conditions before getting the information offered as above.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A service managing apparatus for managing an information transmission service in which digital content is sent in real time between communication devices connected to each other over a network, the apparatus comprising:
- a communication controlling means for controlling the communication with each of the communication devices;
- an information registering means for maintaining registration information on more than one piece of digital content available from those of the communication devices that are registered as an information provider; and
- an information managing means for dynamically generating, based on the registration information, choices-window information from which selection is made of a desired one of the plurality of pieces of offered digital content by those of the communication devices that are to receive the desired piece of offered digital content,
- the information managing means updating, when the registration information has been updated based on updating information reflecting the current status of the information provider, the choices-window information on the basis of the updated registration information, wherein the choices-window information includes information indicative of whether the communication device that is the information provider can currently provide the offered digital content in real time, and
- wherein the communication controlling means controls the connection between the communication device that receives the desired piece of offered digital content and the communication device that is the information provider, with the desired piece of offered digital content being provided in real time when it is indicated as currently available in real time.

2. The apparatus according to claim 1, wherein the information managing means generates the choices-window information from which selection is available only for digital content that can currently be provided in real time.

3. The apparatus according to claim 1, wherein the updating information includes types of more than one media which can be used for the real-time provision of the offered digital content.

4. The apparatus according to claim 1, wherein:
- the information managing means receives the registered information and registers it into the information registering means; and
- the communication device receives the updating information and updates the registered information.

5. The apparatus according to claim 4, wherein the communication controlling means receives the updating information from the communication device which provides the digital content in real time.

6. The apparatus according to claim 1, wherein the digital content is video content.

7. The apparatus according to claim 1, wherein the digital content is audio content.

8. The apparatus according to claim 1, wherein the communication devices are voice over internet protocol devices, and wherein when selection is made of a desired one of the plurality of pieces of offered digital content, the communication controlling means establishes a session between the communication device that receives the desired piece of offered digital content and the communication device that is the information provider to accommodate providing the offered digital content in real time.

9. The apparatus according to claim 8, wherein the communication controlling means establishes the session between the communication devices without requiring user input of connection addresses from the respective communication devices.

10. A service managing method of managing an information transmission service in which digital content is sent in real time between communication devices connected to each other over a network, the method comprising:
- an information managing step in which, referring to an information registering means in which information on more than one piece of offered digital content available from those of the communication devices that are registered as an information provider is maintained as registration information, there is dynamically generated choices-window information from which selection is made of a desired one of the plurality of pieces of offered digital content by those of the communication devices that are to receive the desired piece of offered digital content,
- an information updating step of updating, when the registration information has been updated based on updating information reflecting the current status of the information provider, the choices-window information on the basis of the updated registration information, wherein the choices-window information includes information indicative of whether the communication device that is the information provider can currently provide the offered digital content in real time, and
- a controlling step of controlling the connection between the communication device that receives the desired piece of offered digital content and the communication device that is the information provider, with the desired piece of offered digital content being provided in real time when it is indicated as currently available in real time.

11. The method according to claim 10, wherein in the information managing step, there is generated the choices-window information from which selection is available only for digital content that can currently be provided in real time.

12. The method according to claim 10, wherein the updating information includes types of more than one media which can be used for the real-time provision of the offered digital content.

13. The method according to claim 10, wherein in the information updating step, the choices-window information is updated based on the registered information updated with the updating information received from the communication device which provides the offered digital content in real time.

14. The method according to claim 10, wherein the digital content is video content.

15. The method according to claim 10, wherein the digital content is audio content.

16. The method according to claim 10, wherein the communication devices are voice over internet protocol devices, and wherein when selection is made of a desired one of the plurality of pieces of offered digital content, the controlling step establishes a session between the communication device that receives the desired piece of offered digital content and the communication device that is the information provider to accommodate providing the offered digital content in real time.

17. The method according to claim 16, wherein the session is established between the communication devices without requiring user input of connection addresses from the respective communication devices.

18. A service providing system which provides an information transmission service in which digital content is sent in real time between communication devices connected to each other over a network, the system comprising:
    a plurality of communication devices to provide or receive offered digital content to be provided by an information provider or to be used by an information user, respectively, each as a user of the information transmission service,
    each of the communication devices including a communication means for sending or receiving offered digital content to or from the other communication device as a counterpart; and
    a service management device connected to each of the communication devices via a network to manage the information transmission service,
    the service management device including:
        a communication controlling means for controlling the communication with each of the communication devices;
        an information registering means for maintaining registration information on more than one piece of digital content available from those of the communication devices that are registered as information providers; and
    an information managing means for dynamically generating, based on the registration information, choices-window information from which selection is made of a desired one of the plurality of pieces of offered digital content by those of the communication devices that are to receive the desired piece of offered digital content,
    the information managing means updating, when the registration information has been updated based on updating information reflecting the current status of the information provider, the choices-window information on the basis of the updated registration information, wherein the choices-window information includes information indicative of whether the communication device that is the information provider can currently provide the offered digital content in real time, and
    wherein the communication controlling means controls the connection between the communication device that receives the desired piece of offered digital content and the communication device that is the information provider, with the desired piece of offered digital content being provided in real time when it is indicated as currently available in real time.

19. The system according to claim 18, wherein:
    the communication controlling means updates the information registering means when the information user has been authenticated with the user identification information.

20. The system according to claim 19, wherein:
    the updating information includes media information indicative of the type of a media which can be used by the communication device to send the offered digital content when providing the offered digital content; and
    the communication controlling means updates the information registering means with the information indicative of whether the information provider can currently provide the offered digital content and media information included in the updating information.

21. The system according to claim 18, wherein:
    the updating information includes information indicative of the position of the communication device which sends the offered digital content; and
    the communication controlling means controls, based on the position information, the connection between the communication device that receives the desired piece of offered digital content and the communication device that is the information provider.

22. The system according to claim 18, wherein:
    the communication controlling means includes a call controlling means for sending and receiving a connection control signal for establishing the connection between the communication device that receives the desired piece of offered digital content and the communication device that is the information provider; and
    the connection controlling means receives the connection control signal from the call controlling means in the communication device and controls the connection between both the communication devices.

23. The system according to claim 18, wherein the digital content is video content.

24. The system according to claim 18, wherein the digital content is audio content.

25. The system according to claim 18, wherein the communication devices are voice over interne protocol devices, and wherein when selection is made of a desired one of the plurality of pieces of offered digital content, the communication controlling means establishes a session between the communication device that receives the desired piece of offered digital content and the communication device that is the information provider to accommodate providing the offered digital content in real time.

26. The system according to claim 25, wherein the communication controlling means establishes the session between the communication devices without requiring user input of connection addresses from the respective communication devices.

27. A service providing method for a service providing system including a plurality of communication devices to send or receive offered digital content to be provided by an information provider or to be used by an information user, respectively, each as a user of the information transmission service in which information is sent from one of communication devices connected to each other over a network to the other, and vice versa, in real time, and a service management device connected to each of the communication devices via the network to manage the information transmission service, the method comprising:

an information registering step in which information on more than one piece of offered digital content available from those of the communication devices that are registered as information providers is maintained as registration information into an information registering means of the service management device;

an information managing step in which, referring to an information registering means of the information management device in the service management device, there is dynamically generated choices-window information from which an information user of the offered digital content selects a desired one of the plurality of pieces of offered digital content for the communication device that is to receive the desired piece of offered digital content;

a registered information updating step of updating the registration information on the basis of updating information reflecting the current status of the information provider;

a choices-window information updating step in which an information management means updates, when the information registering means has been updated based on the updating information, the choices-window information on the basis of the updated registration information, wherein the choices-window information includes information indicative of whether the communication device that is the information provider can currently provide the offered digital content in real time; and a controlling step of controlling the connection between the communication device that receives the desired piece of offered digital content and the communication device that is the information provider, with the desired piece of offered digital content being provided in real time when it is indicated as currently available in real time.

28. The method according to claim 27, wherein:
the updating information includes information indicative of the type of a media which can be used when providing the offered digital content; and
in the choices-window information updating step, the choices-window information is made to reflect the information indicative of whether the information provider can currently provide the offered digital content in real time and media information included in the updating information.

29. The method according to claim 27, wherein:
the updating information is indicative of the position of the communication device which sends the offered digital content; and in the controlling step, there is controlled, based on the position information, the connection between the communication device which sends the selected offered digital content and that which has selected the desired offered digital content.

30. The method according to claim 27, wherein the digital content is video content.

31. The method according to claim 27, wherein the digital content is audio content.

* * * * *